March 1, 1960     R. KUDDIE     2,926,828
VACUUM BOTTLE HOLDER AND RACK
Filed Feb. 18, 1959     2 Sheets-Sheet 1
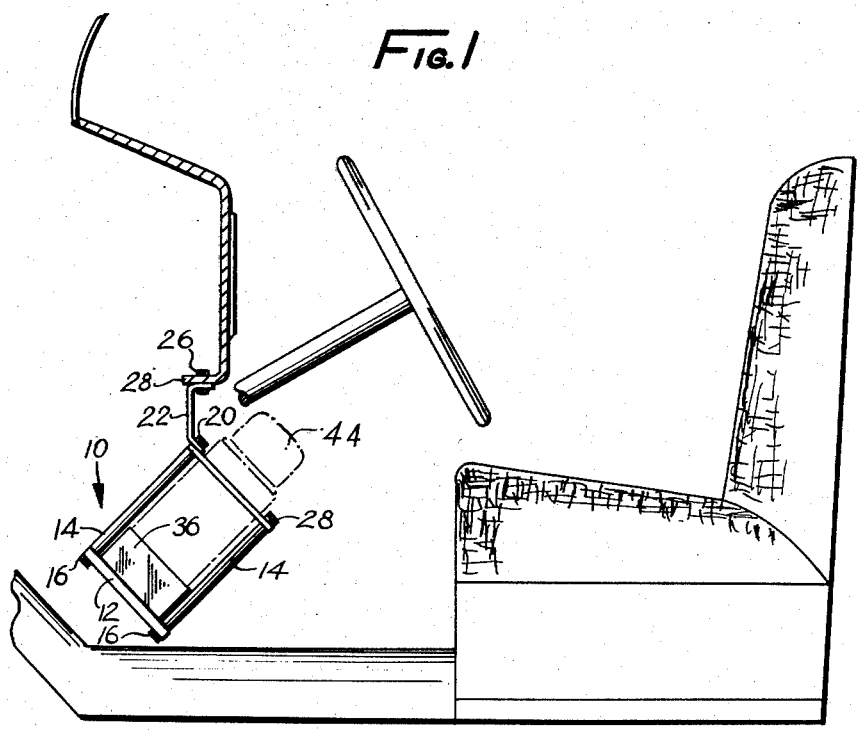
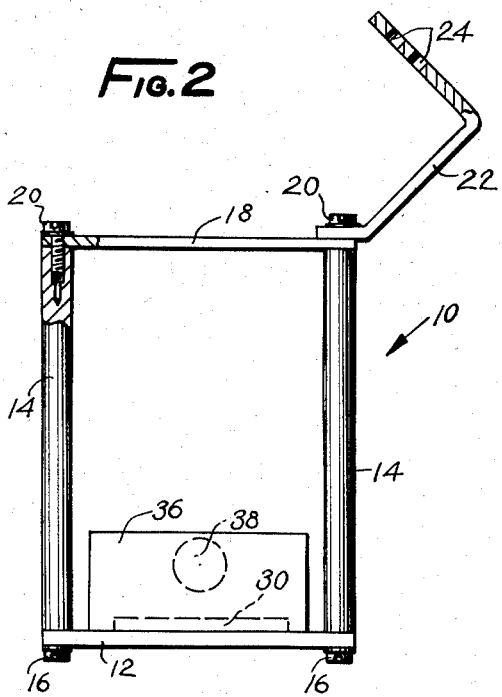
INVENTOR.
ROBERT KUDDIE March 1, 1960  R. KUDDIE  2,926,828
VACUUM BOTTLE HOLDER AND RACK
Filed Feb. 18, 1959  2 Sheets-Sheet 2

INVENTOR.
ROBERT KUDDIE

United States Patent Office 2,926,828
Patented Mar. 1, 1960

2,926,828

VACUUM BOTTLE HOLDER AND RACK

Robert Kuddie, Johnson City, N.Y.

Application February 18, 1959, Serial No. 794,071

1 Claim. (Cl. 224—42.46)

This invention relates to automotive vehicles and more particularly to an accessory therefor.

It is an object of the present invention to provide a holder and rack for conveniently supporting one or more vacuum bottles beneath the dashboard of the vehicle for use during travel.

Another object of the present invention is to provide a vacuum bottle holder and rack which will be conveniently mounted beneath the dashboard and out of the way of the feet of the driver and passengers, and which will not detract from the appearance of the vehicle interior.

Still another object of the present invention is to provide a vacuum bottle holder and rack of the above type which will support a pair of vacuum bottles of different sizes and which has self contained cushion and shock absorbing means for preventing damage to the vacuum bottles and to minimize vibrations and rattling thereof.

Other objects of the invention are to provide a vacuum bottle holder and rack bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which:

Figure 1 is a side elevational view of a vacuum bottle holder and rack made in accordance with the present invention in operative use;

Figure 2 is an enlarged side elevational view, with parts broken away, of the bottle holder and rack shown in Figure 1;

Figure 3:
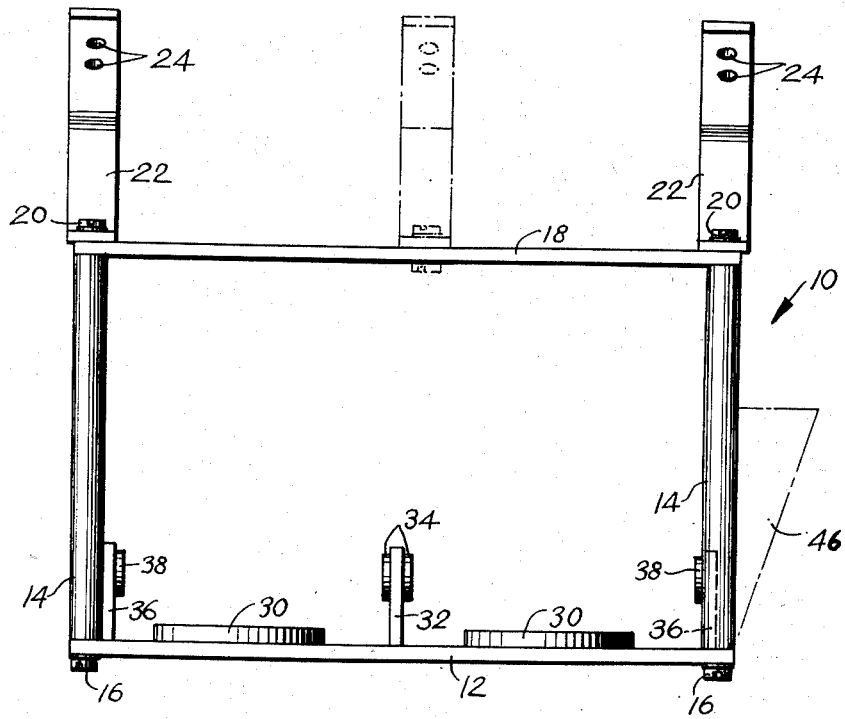
Figure 3 is a front elevational view of the device shown in Figure 2.

Referring now more in detail to the drawing, and more particularly to Figures 1 and 2 thereof, a vacuum bottle holder 10 made in accordance with the present invention is shown to include a base 12 and a top panel 18 secured in spaced apart parallel relationship by means of spacer rods 14 of equal length that are secured, such as by bolts 16, 20 at opposite ends to the respective base panel 12 and top panel 18. A pair of angle brackets 22, secured at one end by the upper bolts 20 to the rearmost ones of the posts 14, is provided with spaced apart mounting holes 24 through which securement bolts 26 may be extended for mounting the unit 10 beneath the dashboard 28 of the vehicle, so that such is out of the way of the feet of the driver and passengers and substantially hidden from view.

Figure 4:
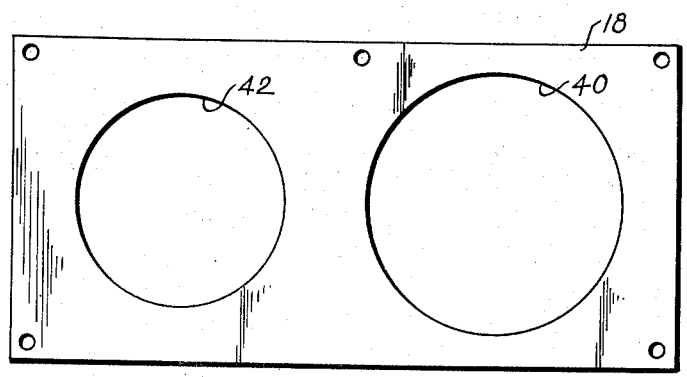
Figure 4 is a top plan view of the device shown in Figure 3, with parts removed.

With further reference now to Figures 3 and 4 of the drawing, it will be noted that a pair of resilient pads 30 are secured in spaced apart relationship upon the upper surface of the base panel 12 in direct alignment with circular openings 40, 42 in the top panel 18. The size of the openings 40, 42 in the top panel 18 are slightly larger than the diameter of quart and pint size vacuum bottles of conventional construction 44 so as to slidably receive them therewithin. The pads 30 are resilient so as to cushion shocks and vibrations that might otherwise result from direct contact of the vacuum bottles with the base plate 12. In addition, at center web 32 is mounted upon the base panel 12 intermediate the pads 30, such center web 32 being provided with additional resilient cushion pads 34 that engage adjacent sides of the vacuum bottles 44. End webs 36 mounted at the opposite ends of the base panel 12 also include resilient cushion pads 38 for engaging the opposite sides of the vacuum bottles, whereby such vacuum bottles are resiliently secured in place upon the base panel 12 and thus prevented from vibrating or rattling which would cause annoyance to the occupants of the vehicle and perhaps damage the parts of the vacuum bottles. In addition, a pocket or rack 46 may be secured to either side of the holder 10 for conveniently storing maps and other travel information during use.

It will now be recognized that this device 10 may be readily mounted beneath the dashboard of the vehicle so that the occupants may be conveniently supplied with liquids from such vacuum bottles during long periods of travel without interfering with the comfort of the passengers or detracting from the appearance of the interior of the vehicle. Of course, this device may be conveniently constructed from any light metal, hard rubber, or plastic material, and may be equally as conveniently used in aircraft, boats, and other vehicles.

While various changes may be made in the detail construction, it shall be understood that such changes shall be within the spirit and scope of the present invention as defined by the appended claim.

Having thus described my invention, I claim as new and desire to secure by Letters Patent:

A vacuum bottle holder comprising, in combination, a base panel comprising a substantially flat rectangular plate, a top panel comprising a substantially flat rectangular plate defining a pair of spaced-apart circular openings, with each one of said openings being of different size for slidably receiving vacuum bottles therethrough of different capacities, spacer means securing said top panel in spaced-apart parallel relationship with respect to said base panel and comprising a plurality of posts of substantially equal length, and bolts securing the opposite ends of said posts to each of said base and top panels to maintain said base and top panels in spaced-apart parallel relationship, bracket means comprising a pair of angle brackets extending upwardly and angularly outwardly from said top panel, said spacer post bolts rigidly securing said angle brackets to said top panel, said angle brackets being provided with fastening means for mounting said holder beneath a vehicle dashboard, first cushion means comprising a pair of substantially flat disc-shaped circular pads secured to the upper surface of said base panel in direct alignment with corresponding ones of said circular openings in said top panel for resiliently positioning each slidably received vacuum bottle thereon, a central upwardly directed web rigidly carried by said base panel intermediate said circular cushion pads, and an end web rigidly carried by each longitudinal extremity of said base panel on diametrically opposite sides of both of said circular cushion pads, and second cushion means comprising resilient pads mounted upon both sides of said center web and on the inner side of said end webs yieldably engaging and receiving corresponding side portions of the lower ends of each of the vacuum bottles therebetween.

References Cited in the file of this patent

UNITED STATES PATENTS

| | | |
|---|---|---|
| 541,457 | Roscoe | June 25, 1895 |
| 665,776 | Fletcher | Jan. 8, 1901 |
| 1,079,192 | Sowden | Nov. 18, 1913 |
| 1,460,068 | Linfoot | June 26, 1923 |
| 1,957,263 | Gray | May 1, 1934 |
| 2,017,319 | McMullen | Oct. 15, 1935 |
| 2,215,411 | Sebring | Sept. 17, 1940 |